United States Patent [19]

Fyles et al.

[11] 4,345,037
[45] Aug. 17, 1982

[54] ALKALI RESISTANT GLASS FIBRES FOR CEMENT REINFORCEMENT

[75] Inventors: Kenneth M. Fyles; Peter Shorrock, both of Wigan, England

[73] Assignee: Pilkington Brothers Limited, St. Helens, England

[21] Appl. No.: 238,515

[22] Filed: Feb. 26, 1981

[30] Foreign Application Priority Data

Feb. 27, 1980 [GB] United Kingdom ............... 8006653

[51] Int. Cl.³ .................................. C03C 13/00
[52] U.S. Cl. ................................. 501/38; 65/2; 65/32; 106/99; 501/57; 501/58; 501/59; 501/61; 501/62; 501/64; 501/67; 501/71
[58] Field of Search .................. 106/50, 99; 501/35, 501/38, 57, 58, 59, 61, 62, 64, 67, 71

[56] References Cited

U.S. PATENT DOCUMENTS

| Re. 29,388 | 9/1977 | Atkinson | 501/38 |
|---|---|---|---|
| 3,060,041 | 10/1962 | Loewenstein | 501/38 |
| 3,840,379 | 10/1974 | Wolf | 501/38 |
| 3,861,926 | 1/1975 | Irwam et al. | 501/38 |
| 4,008,094 | 2/1977 | Beall et al. | 106/99 |
| 4,062,689 | 12/1977 | Suzuki et al. | 501/38 |
| 4,067,744 | 1/1978 | Ohtomo et al. | 501/38 |
| 4,090,882 | 5/1978 | Rauschenfels | 106/99 |
| 4,140,533 | 2/1979 | Ohtomo et al. | 501/38 |
| 4,243,421 | 1/1981 | Kume | 501/38 X |

FOREIGN PATENT DOCUMENTS

| 14160 | 8/1980 | European Pat. Off. | 106/50 |
|---|---|---|---|
| 54-99117 | 8/1979 | Japan | 501/38 |
| 2046726 | 11/1980 | United Kingdom | 106/50 |

*Primary Examiner*—Helen M. McCarthy
*Attorney, Agent, or Firm*—Sughrue, Mion, Zinn, Macpeak & Seas

[57] ABSTRACT

Alkali-resistant glass fibres for use as reinforcement in cementitious products are formed from a composition comprising, in weight percentages:

| $SiO_2$ | 55 to 75% |
|---|---|
| $R_2O$ | 11 to 23% |
| $ZrO_2$ | 6 to 22% |
| $Cr_2O_3$ | 0.1 to 1% |
| $Al_2O_3$ | 0.1 to 7% |
| Rare earth oxides + $TiO_2$ | 0.5 to 16% | where $R_2O$ is any one or more of $Na_2O$, $K_2O$ or $Li_2O$, the content of $TiO_2$ does not exceed 10%, and the total of the components recited above amounts to at least 88% by weight of the glass, the glass having been melted under non-oxidizing conditions such that all or a substantial proportion of the chromium in the glass is in the trivalent state.

Cementitious products incorporating such fibres, e.g. in a proportion of 3 to 6 weight %, can be made using a Magnani-type asbestos cement machine or by a "spray-up" method.

15 Claims, 7 Drawing Figures

ALKALI RESISTANT GLASS FIBRES FOR CEMENT REINFORCEMENT

BACKGROUND OF THE INVENTION

1. Field of the Invention

This invention relates to alkali-resistant glass fibres and to cementitious products reinforced with such alkali-resistant glass fibres.

2. Description of the Prior Art

It is well known that glass fibres which are to be used as a reinforcing material for inorganic cements, such as ordinary Portland cement, must be resistant to attack in the alkaline environment of the cement matrix. Most commercially available alkali-resistant glass fibres are made from a relatively simple glass composition in which the components which act together to confer resistance to such attack are a combination of calcium oxide (CaO) and zirconium oxide ($ZrO_2$). Considerable work has been reported in the literature, and in particular in the patent literature, on attempts to produce an improvement in performance over that of the available glasses. Efforts have also been directed to developing compositions whose performance in a cement matrix is comparable to that of the available glasses but which are also capable of being fiberised more economically. In order to obtain a fibre product which can be incorporated into a cement composite in a satisfactory manner, producing a reinforcing effect, it is necessary to make the glass fibre in continuous filament form by a mechanical drawing process, in which the glass filaments are drawn from multiple orifices in the base of a container known as a bushing. Such a process imposes limitations on the choice of suitable components to confer alkali resistance and the quantity of such components that can be used.

In order to draw continuous filaments in the equipment presently available, using bushings of a high temperature resistant platinum alloy, it is important that the actual drawing temperature should not exceed 1350° C. and preferably not 1320° C., as otherwise the useful working life of the bushings will be reduced with a resultant increase in production costs. It is also important that there should be a positive difference between the working or drawing temperature $T_w$ and the liquidus temperature $T_l$ of the glass. $T_w$ is defined as the temperature at which the viscosity is 1000 poises because this is the viscosity to which a glass melt is normally adjusted for mechanical drawing into fibres from a platinum alloy bushing. It is preferable to have a difference of at least 40° C. between $T_w$ and $T_l$ and in practice bushing operators prefer a difference of about 80° C.

Several materials have been identified as conferring alkali resistance on glass, but they generally also make the drawing of continuous filaments more difficult. $ZrO_2$, for example, increases both the viscosity and the liquidus temperature of the molten glass. One cannot, therefore, simply keep adding more and more of any such material, particularly a material such as $ZrO_2$, without causing the glass to have either a drawing temperature above 1350° C. or a negative or insufficient value for $T_w-T_l$. Glass compositions of various formulations have been proposed in the prior art. British Pat. No. 1,290,528 (U.S. Pat. No. 3,861,926) in the name of the present applicant is believed to be the earliest specification which discusses the problem of obtaining a composition with adequate alkali resistance while still fulfilling the requirements for drawing temperature and $T_w-T_l$. Fibres having a composition within the scope of the claims of that patent are now commercially available under the Registered Trade Mark Cem-FIL. This composition is in weight %

| | |
|---|---|
| $SiO_2$ | 62 |
| $Na_2O$ | 14.8 |
| CaO | 5.6 |
| $TiO_2$ | 0.1 |
| $ZrO_2$ | 16.7 |
| $Al_2O_3$ | 0.8 |

U.S. Pat. No. 3,840,379 is an example of an attempt to formulate a composition with fiberising characteristics more closely resembling the commercially produced "E" glass (which is generally used where alkali resistance is not required) while still retaining an alkali resistance as good as the commercially available glass within the scope of British Pat. No. 1,290,528 whose composition is given above. The glasses of U.S. Pat. No. 3,840,379 contain $TiO_2$ in addition to CaO and $ZrO_2$. British Pat. Nos. 1,497,223, 1,540,770 and 1,548,776 in the name of Kanebo Limited, discuss the problem of obtaining fiberisable glass compositions with a content of $ZrO_2$ of the order of 20 wt.%. Asahi Glass Co.'s British Patent No. 1,498,917 (U.S. Pat. No. 4,062,689) discloses glass compositions, said to have high alkali resistance and intended for making glass fibres for reinforcement of cementitious products, consisting essentially of:

| | wt. % |
|---|---|
| $SiO_2$ | 45-65 |
| $ZrO_2$ | 10-20 |
| $Cr_2O_3$ | 0-5 |
| $SnO_2$ | 0-5 |
| MO | 0-18 |
| $M'_2O$ | 0-18 |
| $SO_3$ | 0.05-1 | wherein the above components constitute at least 97 wt.% of the compositions, $Cr_2O_3+SnO_2$ is 0.5-10 wt.%, $ZrO_2+SnO_2+Cr_2O_3$ is 12-25 wt.%, M is one or more of Ca, Mg, Zn, Ba and Sr; $M'_2O$ is one or more of $K_2O$ (0-5 wt.%), $Na_2O$ (0-18 wt.%) and $Li_2O$ (0-5 wt.%). This specification thus discloses the use of compositions containing either or both of $SnO_2$ and $Cr_2O_3$ in addition to $ZrO_2$, with a requirements for the presence of at least 0.5 wt.% $Cr_2O_3$ when $SnO_2$ is absent. There is a clearly stated preference for compositions containing $SnO_2$, with or without $Cr_2O_3$, with a total content of these materials in the range 1.5 to 5.5 wt.% and at least 1.0 wt.% $SnO_2$. In the only example which contains $Cr_2O_3$ and no $SnO_2$, $Cr_2O_3$ is 3% and $ZrO_2$ is 20%. We find that a content of $Cr_2O_3$ as high as 3%, with a $ZrO_2$ content of 10% or higher, produces a glass with liquidus and viscosity characteristics which make the drawing of continuous filaments impossible.

$Cr_2O_3$ is a well known component of glass compositions, being used to impart a green tint. Melting any glass batch composition containing, for example, sodium or potassium bichromate as a source of chromium produces a glass in which an equilibrium exists between trivalent and hexavalent chromium oxidation states. Methods of altering this equilibrium by providing either reducing or oxidising conditions are well known to glass makers (see Glass Industry April 1966 pages 200 to 203 "Conditions influencing the state of oxidation of chromium in soda-lime-silica glasses" and Bulletin of the American Ceramic Society Vol. 47 No. 3 (1968) page 244 to 247 "Color characteristics of U.V. absorbing emerald green glass"). The interest in this equilibrium has been primarily one of ensuring that the hexavalent ion is present in order to utilise its extremely strong absorption in the near ultra-violet spectrum.

SUMMARY OF THE INVENTION

According to the invention, alkali-resistant glass fibres for use as reinforcement in cementitious products are formed from a composition comprising, in weight percentages:

| | |
|---|---|
| $SiO_2$ | 55 to 75% |
| $R_2O$ | 11 to 23% |
| $ZrO_2$ | 6 to 22% |
| $Cr_2O_3$ | 0.1 to 1% |
| $Al_2O_3$ | 0.1 to 7% |
| Rare earth oxides + $TiO_2$ | 0.5 to 16% | where $R_2O$ is any one or more of $Na_2O$, $K_2O$ or $Li_2O$, the content of $TiO_2$ does not exceed 10%, and the total of the components recited above amounts to at least 88% by weight of the glass, the glass having been melted under non-oxidising conditions such that all or a substantial proportion of the chromium in the glass is in the trivalent state.

We have found that by ensuring that all or a substantial proportion of the chromium present in the glass-forming network is in the trivalent state, an enhanced alkali resistance can be achieved over glasses in which the chromium is present with a substantial proportion of the chromium in the hexavalent state. A further advantage of maintaining chromium in the trivalent state is that while both $Cr^{3+}$ and $Cr^{6+}$ have low solubilities in glass and therefore cause an increase in liquidus temperature, $Cr^{6+}$ has the capability of precipitating rather erratically as $CrO_3$ giving spuriously high indications of liquidus temperatures.

We have found further that in order to take advantage of the ability of chromium in the trivalent state to provide an enhanced alkali resistance in $ZrO_2$-containing silicate glasses and to achieve a satisfactory drawing temperature and a positive value for $T_w-T_l$, it is necessary to incorporate one or both of rare earth oxides and titanium dioxide ($TiO_2$) in the proportions stated. These additional components have both been found to make an unexpected contribution to retaining the effect of the $Cr^{3+}$ on alkali resistance without an adverse effect on the liquidus temperature.

The rare earth oxides may be added in the form of a naturally available mixture or, preferably, as a relatively cerium-free mixture. One such cerium-free mixture is commercially available under the name of "didymium oxide". The individual rare earths have almost identical chemical and physical properties, so the precise composition of the rare earth mixture employed does not alter the effect of the rare earths on the properties of the glass. For reasons of cost, the content of rare earth oxides preferably does not exceed 10%.

The composition from which the glass fibres are formed may further comprise R'O up to 9% by weight, where R'O is any one or more of MgO, CaO, SrO, BaO, ZnO, FeO, MnO, CoO, NiO and CuO.

Preferably the content of $Al_2O_3$ does not exceed 5% when $ZrO_2$ exceeds 13%.

Further optional components of the composition are $B_2O_3$ up to 5% by weight, PbO up to 2% by weight, $ThO_2$ up to 4% by weight, F up to 1% by weight, or any one of $V_2O_5$, $Ta_2O_5$, $MoO_3$ or $HfO_2$ up to 2% by weight.

Preferably, when the content of rare earth oxides exceeds 2.8% the content of $TiO_2$ does not exceed 5%.

The preferred amounts of the individual $R_2O$ components are:

| | |
|---|---|
| $Na_2O$ | 6 to 20% |
| $K_2O$ | 0 to 10% |
| $Li_2O$ | 0 to 3% |

In order to assess the performance of the glass fibres of the present invention as compared with that of our existing commercially available alkali-resistant fibre whose composition is given above, we have carried out tests on strands of fibres made from a range of compositions within the scope of our invention and on strands of the commercially available fibre. After coating the strands with a size and drying it, the middle section of each strand is encased in a block of ordinary Portland cement paste. At least two series of samples are made and, after curing for 1 day at 100% Relative Humidity, the samples are stored under water, one series at 50° C. and another series at 80° C. These conditions simulate the effect of many years in use in a test period of a few days at 80° C. or a few months at 50° C. Measurements of tensile strength are then made on samples taken out of the series; in the case of those stored under water at 50° C., at monthly intervals up to 6 months and, for those stored under water at 80° C., at daily intervals up to 14 days.

Such tests have been carried out in the Applicants' organisation for almost 10 years now, and it has proved possible to correlate the accelerated testing results with behaviour in a range of climates over periods varying from 10 years in the U.K. to 2 years in Bombay. The results of these trials have shown that the form of strength loss in real conditions is the same as that in accelerated tests and it is now possible to make a reasonable prediction of strength loss behaviour in a variety of climates from a knowledge of the mean annual temperature and the results of the accelerated testing.

The tensile strength of strands of glasses of the present invention were in general found in the tests to have not fallen below $630\pm50$ $MN/m^2$ after 2 months at 50° C. and to have not fallen below $700\pm50$ $MN/m^2$ after 3 days at 80° C., whereas strands of the commercially available glass had fallen below these limits after exposure to such storage conditions.

Because of the differing degrees of mechanical damage suffered by the strands during their preparation for testing, it is difficult to achieve a uniform start value for the purposes of comparison. It is our experience in using accelerated tests of this kind that the final value obtained is not influenced to any great extent by the initial start value. It is more important to consider relative performance of one glass to another. We have found that values of 630 $MN/m^2$ after two months at 50° C. and 700 $MN/m^2$ after 3 days at 80° C., or values in excess of these, generally indicate a worthwhile improvement over commercially available glass. We believe that attainment of these values indicates that the glass will have at least double the life of the commercially available glass fibres.

DETAILED DESCRIPTION OF THE INVENTION

Specific examples of compositions for forming into glass fibres in accordance with the invention are listed in the following Table, with their drawing temperature ($T_w$), liquidus temperature ($T_l$) and the results (where available) of the "strand-in-cement" (S.I.C.) tests described above. The composition and test results for the commercially available glass fibres are included for comparison as Glass No. 1. Other comparative examples are included as Glasses 47 and 61. The final column in the Table shows the approximate improvement in useful life of the glass fibres as compared with fibres of Glass No. 1, expressed as a multiple of the time taken for the fibres of Glass No. 1 to experience a reduction in tensile strength to 630 $MN/m^2$, which is used as a convenient standard. Life improvement figures have been derived from both series of tests, at 80° C. and at 50° C., on the above basis. it should be noted, however, that the tests at 80° C., while useful for initial screening of the compositions, have not been found as reliable as the tests at 50° C.

| Glass No. | SiO$_2$ | Li$_2$O | Na$_2$O | K$_2$O | MgO | CaO | TiO$_2$ | Rare Earth Oxides | ZrO$_2$ | Al$_2$O$_3$ | Cr$_2$O$_3$ | Additional Components | |
|---|---|---|---|---|---|---|---|---|---|---|---|---|---|
| 1 | 62 | | 14.8 | | | 5.6 | 0.1 | | 16.7 | 0.8 | | | |
| 2 | 55.7 | | 16.3 | | | 1.7 | 2.4 | 5.5 | 17.3 | 0.7 | 0.4 | | |
| 3 | 74.8 | 2 | 9 | | | | | 5.5 | 8 | 0.1 | 0.6 | | |
| 4 | 74.8 | 3 | 8 | | | | | 5.5 | 8 | 0.1 | 0.6 | | |
| 5 | 56.95 | | 14.5 | 1.5 | | | | 15.9 | 10 | 0.7 | 0.45 | | |
| 6 | 69.05 | | 14.5 | 1.5 | | | | 5.5 | 8 | 0.7 | 0.75 | | |
| 7 | 63.3 | | 14.5 | 1.5 | | | | 5.5 | 14 | 0.7 | 0.5 | | |
| 8 | 68.17 | | 12 | | | 2 | | 5.5 | 12 | 0.1 | 0.23 | | |
| 9 | 60.05 | | 14 | 7 | | | | 5.5 | 12 | 0.7 | 0.75 | | |
| 10 | 63.35 | | 17 | 3 | | | | 5.5 | 10 | 0.7 | 0.45 | | |
| 11 | 60.3 | | 15 | 8 | | | | 5.5 | 10 | 0.7 | 0.5 | | |
| 12 | 61.4 | | 20 | | | | | 5.5 | 12 | 0.7 | 0.4 | | |
| 13 | 61.55 | | 14.5 | 1.5 | 1.2 | 3.4 | 1.2 | 5.5 | 10 | 0.7 | 0.45 | | |
| 14 | 64.8 | 1.5 | 6 | 9 | | | | 5.5 | 12 | 0.7 | 0.5 | | |
| 15 | 65.3 | | 14.5 | 1.5 | | | | 5.5 | 12 | 0.7 | 0.5 | | |
| 16 | 65.3 | 1 | 12 | 3 | | | | 5.5 | 12 | 0.7 | 0.5 | | |
| 17 | 65.05 | | 14.5 | 1.5 | | | | 5.5 | 12 | 0.7 | 0.75 | | |
| 18 | 67.05 | | 14.5 | 1.5 | | | | 5.5 | 10 | 0.7 | 0.75 | | |
| 19 | 67.3 | | 12.5 | 1.5 | | | | 5.5 | 12 | 0.7 | 0.5 | | |
| 20 | 70.9 | | 14.5 | 1.5 | | | | 5.5 | 6 | 0.7 | 0.9 | | |
| 21 | 69.8 | | 14.5 | 1.5 | | | | 5.5 | 7 | 0.7 | 1 | | |
| 22 | 61.55 | | 14.5 | 1.5 | 1.6 | 4.2 | | 5.5 | 10 | 0.7 | 0.45 | | |
| 23 | 64.3 | | 14.5 | 1.5 | 0.3 | 0.7 | | 5.5 | 12 | 0.7 | 0.5 | | |
| 24 | 61.25 | | 14 | | 1.2 | 3.4 | 1.2 | 5.5 | 10 | 0.7 | 0.75 | PbO 2 | |
| 25 | 64.1 | | 14.5 | 1.5 | | | 1.2 | 5.5 | 12 | 0.7 | 0.5 | | |
| 26 | 62.3 | | 14.5 | 1.5 | | | 5 | 5.5 | 10 | 0.7 | 0.5 | | |
| 27 | 60.2 | | 14.5 | 1.5 | | | 10 | 2.8 | 10 | 0.7 | 0.3 | | |
| 28 | 60.2 | 0.2 | 14 | 2 | | 1.7 | 1 | 4 | 15 | 1.5 | 0.4 | | |
| 29 | 67.05 | | 14.5 | 1.5 | | | | Didym 5.5 | 10 | 0.7 | 0.75 | | |
| 30 | 59.175 | | 16.3 | | | 1.7 | 2.4 | REO 2.8 | 17.3 | 0.1 | 0.225 | | |
| 31 | 61.64 | | 16.3 | | | 1.7 | | 2.8 | 17.0 | 0.1 | 0.46 | | |
| 32 | 62.4 | | 14.5 | 1.5 | | | | 8.3 | 12 | 0.7 | 0.6 | | |

| Glass No. | SiO$_2$ | LiO$_2$ | Na$_2$O | K$_2$O | MgO | CaO | TiO$_2$ | Rare Earth Oxides | ZrO$_2$ | Al$_2$O$_3$ | Cr$_2$O$_3$ | Additional Components | |
|---|---|---|---|---|---|---|---|---|---|---|---|---|---|
| 33 | 61.8 | | 14.5 | 1.5 | | | | 11.0 | 10 | 0.7 | 0.5 | | |
| 34 | 58.275 | | 14.5 | 1.5 | 1.2 | 3.4 | 1.2 | 5.5 | 13.5 | 0.7 | 0.225 | | |
| 35 | 63.7 | | 14.5 | 1.5 | | | | 5.5 | 14 | 0.7 | 0.1 | | |
| 36 | 57.0 | | 14.3 | 2 | | 1.7 | | 5.5 | 19 | 0.1 | 0.4 | | |
| 37 | 58.7 | | 16.3 | | | 1.7 | | 5.5 | 13.3 | 0.1 | 0.4 | ThO$_2$ 4.0 | |
| 38 | 63.1 | | 14.5 | 1.5 | | | | 5.5 | 10.0 | 5.0 | 0.4 | | |
| 39 | 57.2 | 0.2 | 13.9 | 3.6 | | | | 2.8 | 22.0 | 0.1 | 0.2 | | |
| 40 | 57.3 | | 14.5 | 2.5 | | 1.5 | | 2.8 | 17 | 0.1 | 0.3 | B$_2$O$_3$ 4 | |
| 41 | 57.9 | | 15 | 2 | | 1.7 | | 4 | 16.5 | 1.5 | 0.4 | ZnO 1 | |
| 42 | 58.7 | | 14.3 | 2 | | 1.7 (as CaF$_2$) | | 5.5 | 17.3 | 0.1 | 0.4 | (F 0.75) | |
| 43 | 60.0 | | 12.5 | 2 | | 9 | | 4 | 12 | 0.1 | 0.4 | | |
| 44 | 63.95 | | 16.3 | | | 1.7 | | 0.5 | 17 | 0.1 | 0.45 | | |
| 45 | 63.04 | | 16.3 | | | 1.7 | | 1.4 | 17 | 0.1 | 0.46 | | |
| 46 | 58.6 | | 14.5 | 3 | | 1.0 | | 5.5 | 10 | 7 | 0.4 | | |
| 47 | 62.1 | | 16.3 | | | 1.7 | 2.4 | | 17.4 | 0.1 | 0 | | |
| 48 | 61.9 | | 16.3 | | | 1.7 | 2.4 | | 17.45 | 0.1 | 0.15 | | |
| 49 | 61.9 | | 16.3 | | | 1.7 | 2.4 | | 17.4 | 0.1 | 0.20 | | |
| 50 | 61.9 | | 16.3 | | | 1.7 | 2.4 | | 17.3 | 0.1 | 0.30 | | |
| 51 | 61.9 | | 16.3 | | | 1.7 | 2.4 | | 17.15 | 0.1 | 0.45 | | |
| 52 | 61.9 | | 16.3 | | | 1.7 | 2.4 | | 17.0 | 0.1 | 0.60 | | |
| 53 | 59.5 | | 16.3 | | | 1.7 | 4.8 | | 17.15 | 0.1 | 0.45 | | |
| 54 | 62.4 | | 15 | 2 | | | 7 | | 13 | 0.1 | 0.5 | | |
| 55 | 62.4 | | 13.5 | 2 | | | 8.5 | | 13 | 0.1 | 0.5 | | |
| 56 | 62.6 | | 12 | 2 | | | 10 | | 13 | 0.1 | 0.3 | | |
| 57 | 70.1 | | 12 | 2 | | | 4.8 | | 10 | 0.1 | 1.0 | | |

-continued

| | | | | | | | | | | | | |
|---|---|---|---|---|---|---|---|---|---|---|---|---|
| 58 | 72.2 | | 13 | 2 | | 1 | 4.8 | | 6 | 0.1 | 0.9 | |
| 59 | 72.3 | | 13 | 2 | | | 4.8 | | 7 | 0.1 | 0.8 | |
| 60 | 57.6 | | 14.9 | 2.8 | | | 2.4 | | 22 | 0.1 | 0.2 | |
| 61 | 64.4 | | 16.3 | | | 1.7 | | | 17.0 | 0.1 | 0.45 | |
| 62 | 63.8 | | 16.3 | | | 1.7 | 0.5 | | 17.15 | 0.1 | 0.45 | |
| 63 | 63.1 | | 16.3 | | | 1.7 | 1.2 | | 17.15 | 0.1 | 0.45 | |
| 64 | 56.65 | | 14 | 3 | | 4 | 4.8 | | 17 | 0.1 | 0.45 | |
| 65 | 74.4 | 2 | 10 | | | | 3 | | 10 | 0.1 | 0.5 | |
| 66 | 62.85 | | 11 | 7.5 | | | 4.1 | | 14 | 0.1 | 0.45 | |
| 67 | 58.8 | | 14 | 7.5 | | | 2.4 | | 16.8 | 0.1 | 0.4 | |
| 68 | 61.55 | | 14.5 | | | 7 | 2.4 | | 14 | 0.1 | 0.45 | |
| 69 | 61.05 | | 14 | 1 | | 9 | 2.4 | | 12 | 0.1 | 0.45 | |
| 70 | 61.8 | | 16.3 | | | 1.7 | 4.8 | | 10 | 5 | 0.4 | |
| 71 | 57.8 | | 16.3 | | | 1.7 | 4.8 | | 14 | 5 | 0.4 | |
| 72 | 61.15 | 0.2 | 13.0 | 1.5 | | 2.0 | 4.8 | | 16.8 | 0.1 | 0.45 | |
| 73 | 59.9 | | 16.3 | | | 1.7 | 2.4 | | 17.4 | 0.1 | 0.2 | NiO 2 |
| 74 | 59.9 | | 16.3 | | | 1.7 | 2.4 | | 17.4 | 0.1 | 0.2 | MnO 2 |
| 75 | 59.9 | | 16.3 | | | 1.7 | 2.4 | | 17.4 | 0.1 | 0.2 | CuO 2 |
| 76 | 59.9 | | 16.3 | | | 1.7 | 2.4 | | 17.4 | 0.1 | 0.2 | $V_2O_5$ 2 |
| 77 | 59.9 | | 16.3 | | | 1.7 | 2.4 | | 17.4 | 0.1 | 0.2 | CoO 2 |
| 78 | 59.9 | | 16.3 | | | 1.7 | 2.4 | | 17.4 | 0.1 | 0.2 | $Ta_2O_5$ 2 |
| 79 | 59.9 | | 16.3 | | | 1.7 | 2.4 | | 17.4 | 0.1 | 0.2 | $MoO_3$ 2 |
| 80 | 59.9 | | 16.3 | | | 1.7 | 2.4 | | 17.4 | 0.1 | 0.2 | ZnO 2 |

| | COMPOSITION WEIGHT % | | | | | | | | | | | |
|---|---|---|---|---|---|---|---|---|---|---|---|---|
| Glass No. | $SiO_2$ | $Li_2O$ | $Na_2O$ | $K_2O$ | $M_gO$ | CaO | $TiO_2$ | Rare Earth Oxides | $ZrO_2$ | $Al_2O_3$ | $Cr_2O_3$ | Additional Components |
| 81 | 59.9 | | 16.3 | | | 1.7 | 2.4 | | 17.4 | 0.1 | 0.2 | $HfO_2$ 2 |
| 82 | 59.9 | | 16.3 | | | 1.7 | 2.4 | | 17.4 | 0.1 | 0.2 | FeO 2 |
| 83 | 59.8 | 0.45 | 14 | 1.4 | 1.2 | 3.4 | 1.2 | | 16.3 | 0.75 | 0.5 | $ThO_2$ 1 |
| 84 | 64.3 | 1 | 14 | 1 | | | 2.4 | | 10 | 7 | 0.3 | |
| 85 | 61.15 | 0.2 | 13 | 1.5 | | 2 (as $CaF_2$) | 4.8 | | 16.8 | 0.1 | 0.45 | (F 0.9) |

In all the Examples tabulated above, rare earth oxides were in the form of a naturally available mixture except where the cerium-free mixture known as didymium oxide is indicated by the abbreviation "Didym". In Examples 42 and 85, the fluorine contents of 0.75 wt.% and 0.9 wt.% were obtained by incorporation of 1.7 wt.% and 2 wt.% $CaF_2$ respectively. As F replaces O in the glass network, these are equivalent to incorporation of 1.7 wt.% and 2 wt.% CaO in the respective glasses.

| Glass No. | $T_w$ | $T_1$ | S.I.C. at 80° C. | | | | S.I.C. at 50° C. | | | | Life Improvement | |
|---|---|---|---|---|---|---|---|---|---|---|---|---|
| | | | 0d | 3d | 7d | 14d | 1m | 2m | 4m | 6m | 80° C. | 50° C. |
| 1 | 1295 | 1200 | 1200 | 610 | 425 | 340 | 710 | 535 | 440 | 390 | 1x (2.8 days) | 1x (1.3 months) |
| 2 | 1255 | 1250 | 1459 | 930 | — | 725 | 894 | 772 | 654 | 571 | >5x | 3.5x |
| 3 | 1320 | 1280 | 1846 | 867 | 777 | 700 | 890 | 790 | 667 | 570 | >5x | 3.7x |
| 4 | 1280 | 1280 | | | | | | | | | | |
| 5 | 1185 | 1170 | 950 | 794 | 723 | 643 | 878 | 736 | 587 | 576 | 5.5x | 2.6x |
| 6 | 1320 | 1230 | 1210 | 809 | 714 | 687 | 830 | 696 | 477 | 511 | >5x | 2.0x |
| 7 | 1325 | 1250 | 1175 | 876 | 741 | 634 | 965 | 835 | 669 | 574 | 5x | 3.6x |
| 8 | 1350 | 1270 | 1649 | 854 | 708 | 635 | 916 | 769 | 611 | 545 | 5x | 2.7x |
| 9 | 1270 | 1250 | | | | | | | | | | |
| 10 | 1260 | 1140 | 962 | 754 | 599 | 502 | 769 | 624 | 523 | 453 | 2.1x | 1.5x |
| 11 | 1235 | 1200 | 993 | 696 | 594 | 546 | 836 | 796 | 651 | 584 | 1.9x | 3.5x |
| 12 | 1240 | 1190 | | | | | | | | | | |
| 13 | 1230 | 1160 | 1272 | 721 | 565 | — | 726 | 717 | 534 | 530 | 1.8x | 1.8x |
| 14 | 1305 | 1290 | | | | | | | | | | |
| 15 | 1320 | 1220 | >954 | 783 | 762 | 664 | 850 | 733 | 625 | 576 | 6x | 3x |
| 16 | 1290 | 1240 | >744 | >443 | >500 | >550 | >504 | >800 | 646 | 583 | | 3.2x |
| 17 | 1335 | 1250 | 1192 | 851 | 753 | 615 | 944 | 757 | 648 | 590 | 4.5x | 3.5x |
| 18 | 1320 | 1260 | 1146 | 821 | 736 | — | 883 | 700 | 609 | 575 | 4x | 2.6x |
| 19 | 1350 | 1250 | 1113 | 905 | 685 | 594 | 913 | 674 | 610 | 541 | 3.8x | 2.3x |
| 20 | 1310 | 1260 | | | | | | | | | | |
| 21 | 1314 | 1280 | 1366 | 815 | 708 | — | 789 | 736 | 690 | 564 | 5x | 3.5x |
| 22 | 1210 | 1200 | | | | | | | | | | |
| 23 | 1300 | 1220 | >937 | 804 | 671 | 580 | 808 | 681 | 598 | 556 | 3.6x | 2.4x |
| 24 | 1230 | 1220 | 1380 | 693 | 573 | — | 753 | 628 | — | — | 1.8x | 1.5x |
| 25 | 1300 | 1220 | 1224 | 719 | 688 | 616 | 791 | 693 | 644 | 568 | 4.5x | 3.1x |
| 26 | 1260 | 1220 | 1189 | 819 | 735 | 580 | 871 | 740 | 606 | 542 | 4x | 2.7x |
| 27 | 1215 | 1120 | 1273 | 697 | 446 | 363 | 773 | 703 | 604 | — | 1.4x | 2.5x |
| 28 | 1300 | 1200 | | | | | | | | | | |
| 29 | 1320 | 1260 | 1134 | 864 | 787 | — | 792 | 686 | 668 | 525 | 5x | 3.5x |
| 30 | 1280 | 1200 | 1170 | 699 | 597 | 577 | 770 | 637 | 521 | 510 | 1.9x | 1.6x |
| 31 | 1310 | 1200 | 1014 | | | | 976 | 795 | 707 | 585 | >5x | 4x |
| 32 | 1300 | 1250 | 1125 | 835 | 711 | 616 | 939 | 801 | 675 | 607 | 4.5x | 3.9x |
| 33 | 1270 | 1240 | 1098 | 817 | 726 | 683 | 867 | 735 | 513 | 493 | 5x | 2.3x |
| 34 | 1240 | 1190 | 1165 | 752 | 562 | — | 848 | 634 | 611 | 534 | 1.9x | 1.6x |
| 35 | 1330 | 1100 | 1166 | 772 | 701 | 629 | 876 | 721 | 621 | 541 | 5x | 2.6x |

-continued

| Glass No. | $T_w$ | $T_l$ | S.I.C. at 80° C. | | | | S.I.C. at 50° C. | | | | Life Improvement | |
|---|---|---|---|---|---|---|---|---|---|---|---|---|
| | | | 0d | 3d | 7d | 14d | 1m | 2m | 4m | 6m | 80° C. | 50° C. |
| 36 | 1300 | 1270 | | | | | | | | | | |
| 37 | 1290 | 1220 | 1289 | 1080 | 970 | 910 | 1025 | 982 | 726 | 744 | >5x | >5x |
| 38 | 1350 | 1220 | 1648 | 945 | 790 | 780 | 1113 | 832 | 669 | No result | >5x | ~3½x |
| 39 | 1350 | 1300 | 1053 | 751 | 665 | 524 | 930 | 752 | 645 | — | 3.1x | |
| 40 | 1250 | 1210 | 1302 | 686 | 628 | 480 | 715 | 620 | 477 | 2.4x | 1.5x | |
| 41 | 1300 | 1230 | | | | | | | | | | |
| 42 | 1300 | 1210 | | | | | | | | | | |
| 43 | 1210 | 1180 | 1187 | 812 | 650 | 620 | 867 | 626 | 548 | 465 | 4x | 1.5x |
| 44 | 1335 | 1280 | 1055 | 727 | 625 | 573 | 816 | 717 | 588 | 528 | 2.4x | 2.6x |
| 45 | 1325 | 1200 | 1263 | 761 | 670 | 587 | 867 | 769 | 633 | 584 | 3.3x | 3.1x |
| 46 | 1320 | 1260 | | | | | | | | | | |
| 47 | 1310 | 1200 | 1215 | 680 | 589 | 461 | 827 | 629 | 521 | 424 | 1.5x | 1.5x |
| 48 | 1310 | 1190 | 1246 | 728 | 587 | 497 | 1003 | 774 | 581 | 541 | 2.1x | 2.8x |
| 49 | 1310 | 1200 | 1046 | 796 | 641 | 512 | 908 | 703 | 556 | 483 | 2.7x | 2.1x |
| 50 | 1310 | 1240 | 955 | 783 | 674 | 489 | >841 | 757 | 542 | 504 | 3.1x | 2.4x |
| 51 | 1310 | 1240 | 950 | 836 | 632 | 491 | 824 | 707 | 629 | 516 | 2.6x | 3.1x |
| 52 | 1310 | 1290 | 1072 | 862 | 664 | 517 | 971 | 777 | 571 | 520 | 3.1x | 2.5x |
| 53 | 1280 | 1200 | 1014 | 816 | 651 | 540 | 971 | 782 | 655 | 541 | 2.9x | 3.3x |
| 54 | 1275 | 1220 | 1099 | 690 | 597 | 550 | 933 | 804 | 541 | 487 | 1.7x | 2.5x |
| 55 | 1280 | 1270 | 1184 | 710 | 549 | 452 | 873 | 703 | 585 | 498 | 1.6x | 2.3x |
| 56 | 1280 | 1190 | 1418 | 678 | 556 | 454 | 824 | 708 | 538 | 506 | 1.4x | 2.1x |
| 57 | 1340 | 1340 | | | | | | | | | | |
| 58 | 1315 | 1230 | | | | | | | | | | |
| 59 | 1330 | 1210 | 1068 | 742 | 615 | 484 | 841 | 653 | 571 | 482 | 2.0x | 1.8x |
| 60 | 1350 | 1310 | 1025 | 972 | 748 | 571 | 977 | 873 | 668 | 545 | 3.9x | 3.5x |
| 61 | 1340 | 1250 | 1006 | 682 | 582 | 389 | 818 | 619 | 502 | 410 | 1.5x | 1.45x |
| 62 | 1335 | 1210 | 1186 | 817 | 627 | 545 | 873 | 715 | 576 | 525 | 2.5x | 2.2x |
| 63 | 1325 | 1230 | 1064 | 759 | 636 | 492 | 830 | 640 | 480 | 459 | 2.6x | 1.7x |
| 64 | 1250 | 1220 | 1087 | 860 | 730 | 550 | 845 | 784 | 655 | 568 | 3.6x | 3.5x |
| 65 | 1320 | 1250 | 1228 | 730 | 645 | 540 | 837 | 731 | 564 | 524 | 2.7x | 2.6x |
| 66 | 1320 | 1250 | | | | | | | | | | |
| 67 | 1290 | 1260 | 988 | 808 | 628 | 494 | 914 | 728 | 580 | | 2.5x | 2.5x |
| 68 | 1240 | 1180 | 1216 | 760 | 644 | 523 | 868 | 710 | 604 | 458 | 2.8x | 2.5x |
| 69 | 1205 | 1190 | | | | | | | | | | |
| 70 | 1290 | 1240 | | | | | | | | | | |
| 71 | 1300 | 1270 | | | | | | | | | | |
| 72 | 1300 | 1240 | 1281 | 932 | 674 | 595 | 868 | 716 | 669 | 562 | 3.4x | 3.5x |
| 73 | 1280 | | 1096 | 698 | 567 | 477 | 785 | 642 | 540 | 474 | 1.6x | 1.7x |
| 74 | 1280 | | 1168 | 695 | 540 | 453 | 894 | 701 | 600 | 489 | 1.6x | 2.3x |
| 75 | 1280 | | 996 | 774 | 590 | 495 | 911 | 733 | 587 | 484 | 2.1x | 2.4x |
| 76 | 1280 | 1220 | 1209 | 719 | 579 | 512 | 1073 | 778 | 560 | 469 | 1.9x | 2.4x |
| 77 | 1280 | | 1193 | 828 | 587 | 470 | 915 | 750 | 554 | 500 | 2.1x | 2.3x |
| 78 | 1280 | 1200 | 895 | 789 | 657 | 548 | 836 | 758 | 608 | 531 | 2.9x | 2.7x |
| 79 | 1280 | 1180 | 769 | 651 | 595 | 468 | 765 | 702 | 533 | 448 | 1.6x | 2x |
| 80 | 1280 | 1200 | 1080 | 771 | 620 | 480 | 929 | 701 | 584 | 515 | 2.2x | 2.2x |
| 81 | 1310 | 1190 | 1198 | 766 | 600 | 512 | 893 | 744 | 626 | 537 | 2.1x | 2.9x |
| 82 | 1280 | | 1165 | 909 | 689 | 530 | 977 | 807 | 630 | 514 | 3.1x | 3.1x |
| 83 | 1290 | 1230 | 1112 | 962 | 867 | 727 | 982 | 823 | 672 | 575 | >5x | 3.8x |
| 84 | 1335 | 1260 | 1288 | 700 | 488 | 380 | 925 | | | | 1.4x | |
| 85 | ca 1300 | 1250 | | | | | | | | | | |

In considering the improvement achieved by the present invention in relation to specific glass compositions, it is convenient to consider separately the two main classes of glasses according to the present invention, i.e. those containing from 0.5% to 16% rare earth oxides (which may also contain TiO₂) and those in which the rare earth oxide content is absent and which have a content of 0.5% to 10% TiO₂ to provide the glass with satisfactory viscosity, liquidus and durability characteristics.

Examples 2 to 46 in the Table illustrate glasses containing rare earth oxides, having a temperature $T_w$ which does not exceed 1350° C. and which is at least equal to the liquidus temperature $T_l$. The SiO₂ range is 55 to 75% and the extreme ends of this range are illustrated by Examples 2 and 3. Example 2 could be fiberised by the continuous filament process, though with some difficulty, because $T_w - T_l$ is only 5° C. Example 3 again could be fiberised, though with a shorter bushing life, because $T_w$ is 1320° C. As SiO₂ is increased it is necessary to reduce the ZrO₂ content and increase the quantity of Cr₂O₃ in the glass composition, in order to retain a sufficiently low $T_w$ and high alkali resistance. Example 4 in comparison with Example 3 shows how $T_w$ can be reduced by partial substitution of Li₂O for Na₂O. In order to provide a proper comparison between these three glasses, the rare earth oxide mixture content has been kept constant. Example 5 shows the effect of using a rare earth oxide content near to the maximum with mixed alkali oxides, in a composition with a similar SiO₂ content to Example 2. The increased rare earth content enables one to use a lower content of ZrO₂ than in Example 2, while achieving similar high alkali resistance. As regards the fiberising properties, these alterations increase $T_w - T_l$ from 5° C. to 15° C. in Example 5.

Example 6 in comparison with Example 3 shows how, with a reduction in SiO₂ from 75 wt.% to 69 wt.% and an increased R₂O content of 16 wt.%, a more favourable value of $T_w - T_l$ (90° C.) may be obtained while still achieving a considerable increase in resistance to attack in comparison to the commercially available glass (Glass No. 1). Thus while the upper limit of 75% for $SiO_2$ represents the practical limit in the glasses of our invention, there is no need to operate at such levels of $SiO_2$ in order to obtain adequate alkali resistance. Example 7 in comparison with Example 2 shows how, by an increase in $SiO_2$ content from 55% to 63%, a slight reduction in $ZrO_2$ and an increase in $Cr_2O_3$, a much more favourable $T_w-T_l$ condition can be obtained with still a considerable increase in resistance to attack in the standard comparison test. In general we find it preferable to operate with $SiO_2$ levels in the range 57 to 69 wt.% in order to obtain glasses with a $T_w-T_l$ value more acceptable to a bushing operator.

Increase in the content of alkali oxides ($R_2O$) improves the ease of melting of any particular composition though an increase in alkali oxide content above the upper end of the range can result in a glass which is too fluid for fiberising, because $T_w$ is too low in relation to $T_l$. Examples 3 and 4 illustrate the lower limit of 11 wt.% $R_2O$, made up of $Na_2O$ and $Li_2O$, in a glass with a high $SiO_2$ content and a $Cr_2O_3$ content towards the upper end of its range. The content of 3% $Li_2O$ in Example 4 compared with 2% $Li_2O$ in Example 3 reduces $T_w$ but unfortunately does not affect $T_l$, so that $T_w-T_l$ is reduced to zero. This and similar attempts to include $Li_2O$ have led to the choice of the preferred limit for $Li_2O$ of 3%. Example 8 illustrates the use of an $R_2O$ content of 12%, which is made up solely of $Na_2O$, with added CaO and a lower $Cr_2O_3$ content, thus resulting in a higher $T_w$ but a more favourable value of $T_w-T_l$. Examples 9 to 12 illustrate the upper end of the $R_2O$ range with varying levels of $K_2O$ and $Na_2O$. It will be seen that Examples 10 and 11 show improvements in alkali resistance as compared with the known commercial glass, in the standard test. Examples 9 and 12 were not tested as their contents of components conferring alkali resistance are almost identical with those of Examples 10 and 11; the increases in $Cr_2O_3$ and $ZrO_2$ content in Example 9 would in fact give a slightly better performance. In general we prefer to operate with a total alkali metal oxide ($R_2O$) content of the order of 14 to 17 wt.% and Examples 7 and 13 to 19 illustrate the use of such levels of alkali metal oxide with the preferred $SiO_2$ range of 57 to 69 wt.%. All of these glasses have either been tested in the comparison test or resemble sufficiently other glasses that have been tested to make testing unnecessary. All of these glasses have a positive $T_w-T_l$ and show a satisfactory life improvement in the comparison test.

The alkaline earth oxides CaO and MgO may be incorporated into the glasses of the present invention but have not in this instance been found to have any influence on the alkali resistance of the glasses. We have found that they can be used to facilitate the formulation of fiberisable compositions and it is possible to obtain durable fiberisable compositions with a total content of up to 9 wt.% of alkaline earth oxides. Examples 13, 22 and 43 illustrate the use of 4.6, 5.8 and 9.0 wt.% total alkaline earth oxides. It is clear from these and the other examples incorporating alkaline earth oxides that at the levels used it is still possible to obtain a positive $T_w-T_l$ but we were unable to find any advantage in exceeding 9 wt.%. Example 23 shows a slightly inferior performance to Example 15 from which it only differs by the addition of 1% R'O and a fall in $SiO_2$ of 1.0 wt.%. As a result of tests it is clear that, as regards melting and durability characteristics, strontium, barium, manganese, iron, nickel, zinc, cobalt and copper behave in a similar fashion to calcium and magnesium. They should preferably not be deliberately added but may be present as a result of being present in raw materials used. Iron can also be added to the batch to assist the conversion of chromium to the $Cr^{3+}$ state. However, as with CaO and MgO, the upper limit for compounds of strontium, barium, manganese, iron, nickel, zinc, cobalt and copper in the batch is 9 wt.%.

Fluorine (from 0.1 to 1%) can be added as $CaF_2$, for example, as in Example 42, to assist in melting the batch of glass-making materials. If it is retained in the molten glass, it reduces its viscosity and hence the fiberising temperature $T_w$. Fluorine replaces oxygen in the glass network, so the incorporation of $CaF_2$ is equivalent to incorporation of CaO.

$B_2O_3$ is another well known glass component, useful for reducing the risk of devitrification. However, it has an adverse effect on durability and in amounts above 5% can cause a substantial reduction in alkali resistance which outweighs any advantage its use might have.

Alumina is normally present, even when not deliberately added to the batch, because of its presence in the raw materials used, such as the sand used as a source of $SiO_2$. Examples 38 and 46 illustrate the use of 5 and 7 wt.% $Al_2O_3$, respectively. Because of the effect of $Al_2O_3$ in increasing liquidus temperature, it should not be deliberately added in quantities such that the total $Al_2O_3$ in the glass formed is above 7 wt.%.

Lead tends to reduce liquidus but tends also to reduce alkali resistance. If PbO is present it is important to avoid conditions leading to the formation of lead metal in the glass, which can occur if anthracite is included in the batch. Example 24 is a glass containing 4.6% of alkaline earth oxides as well as 2% PbO and the glass has a low value for $T_w-T_l$ of only 10° C.

Where more than 2.8% of rare earth oxides are included in the glass, the principal effect of substituting $TiO_2$ for $SiO_2$ is to reduce the viscosity of the melt and hence the fiberising temperature $T_w$, the effects on liquidus temperature $T_l$ and alkali resistance being fairly small. When $ZrO_2$ is at or near its upper limit of 22%, $TiO_2$ may increase the risk of devitrification. We prefer not to exceed 5 wt.% $TiO_2$ but up to 10 wt.% can be added provided that care is taken to avoid devitrification. Example 25 which contains 1.2 wt.% $TiO_2$ can be compared with Example 15 which is the same composition apart from the substitution of $SiO_2$ for $TiO_2$. The alkali resistance is of the samer order and $T_w$ has fallen from 1320° C. for Example 15 to 1300° C. for Example 25. Example 26 is similar to Example 18 except for the substitution of 5% $TiO_2$ for $SiO_2$ and a reduction in $Cr_2O_3$ while Example 27 contains the maximum of 10% $TiO_2$ with further reductions in $SiO_2$ and $Cr_2O_3$ and a reduction in the rare earth oxides. Both these examples again show the reduction in $T_w$ obtained by addition of $TiO_2$. There is therefore, in most cases of glasses containing more than 2.8% rare earth oxides, no advantage to be gained by the addition of $TiO_2$, but up to 10 wt.% may be added where a reduced value of $T_w$ is required.

The alkali resistance of glasses containing rare earth oxides will, with constant levels of zirconium and chromium, increase if the level of rare earth oxides is increased. The rare earths may be present as a naturally occurring mixture, or as the cerium-depleted mixture sold as didymium oxide as in Example 29. Example 29 is the same as Example 18 except that the content of rare earth oxides was obtained by use of the same amount of the mixture known as didymium oxide. The comparison tests show that no deterioration in properties occurs.

Scandium and yttrium, which are sometimes referred to as pseudo-rare earths, are here included in the general term. The rare earth oxides enable good alkali resistance to be achieved in glasses with a relatively low $ZrO_2$ content without an unacceptable increase in $Cr_2O_3$. Example 5 is a glass which has a rare earth oxide content of 15.9 wt.% and is comparable in alkali resistance with Examples 6 and 7 where the rare earth oxide content is 5.5 wt.% with, in one case, a lower content of $ZrO_2$ and the other a higher content of $ZrO_2$. In the case of Example 6, the fall in $ZrO_2$ content has been balanced by a small increase in $Cr_2O_3$ content. When using rare earths, the minimum quantity of rare earth oxides which have a useful effect is 0.5 wt.%. Examples 44 and 45 show that it is possible to use such low amounts of rare earth oxides (0.5 and 1.4 wt.% respectively) with useful results. Example 30 shows that with 2.8% rare earth oxides an improvement in alkali resistance over that of Glass No. 1 can be obtained when working with a similar high $ZrO_2$ content of 17.3 wt.%, even though the $Cr_2O_3$ is at the low level of 0.225 wt.%. Example 31 has a similar rare earth content to Example 30 but contains no $TiO_2$. We prefer to work with a rare earth oxide content of around 3 to 5.5 wt.%, a $ZrO_2$ content of 14 to 16 wt.% and a $Cr_2O_3$ content of about 0.3 to 0.5 wt.%. Examples 32 and 33 illustrate the use of rare earth oxide contents between 5.5 wt.% and the upper limit of 16.0 wt.%. The choice of rare earth oxide content can therefore be made quite freely in the range 0.5 to 16 wt.%. However, the cost of the batch must be considered in working at the upper end of the range, as the increase in cost due to use of amounts of rare earth oxides of around 16 wt.% may not be offset by the reduction in cost due to the reduced content of $ZrO_2$ which is necessary and we prefer not to exceed a rare earth content of 10 wt.%.

There is an inter-relation between choice of $ZrO_2$ content and $Cr_2O_3$ content. Little or no improvement in the strength comparison test over Glass No. 1 will be achieved at the lower end of the $Cr_2O_3$ range, i.e. of around 0.2 wt.% $Cr_2O_3$, if the content of $ZrO_2$ is allowed to fall below about 13.5%. Example 34 shows the results obtained with $ZrO_2 = 13.5$ wt.% and $Cr_2O_3 = 0.225$ wt.%. Example 18 shows how with an increase in $Cr_2O_3$ content to 0.75 wt.% and a fall in $ZrO_2$ content to 10 wt.%, a much better performance is achieved in the comparison test. Example 21 illustrates the use of the maximum value of $Cr_2O_3$ of 1.0 wt.%, while Example 20 shows the use of 0.9% $Cr_2O_3$ with the minimum quantity of $ZrO_2$ of 6%. At values of $Cr_2O_3$ above 1.0 wt.% it would be necessary for $ZrO_2$ to be less than 6 wt.% in order to produce a satisfactory glass for fiberising and, at such levels of $ZrO_2$, no significant improvement in alkali resistance is produced over the commercially available glasses. 6 wt.% is therefore the lower limit for $ZrO_2$ at which an improvement can be produced. When operating at the upper end of the $Cr_2O_3$ range and when $Cr_2O_3$ is approaching 1 wt.%, $ZrO_2$ should be below 10 wt.%. At the other end of the $Cr_2O_3$ range it is important when operating with quantities of $Cr_2O_3$ below 0.3% that the $Cr^{3+}$ content should not fall below 70% of the total chromium and should preferably be near to 100%. Example 35 illustrates the use of $Cr_2O_3$ at 0.1 wt.%. The use of $ZrO_2$ near and at the upper end of its range is illustrated by Examples 36 and 39. Further improvement in alkali resistance can be produced by additions of $ThO_2$, preferably in amounts from 0.4% to 4% (see Example 37).

Those glasses in which the rare earth oxides are absent and which contain 0.5% to 10% $TiO_2$ are exemplified by Comparative Example 47 and Examples 48 to 85. In considering in more detail the choice of these glasses, which have a fiberising temperature below 1350° C. and a positive $T_w - T_l$, it is necessary for $TiO_2$ to be at least 0.5% in order to achieve acceptable levels of improvement in alkali resistance through the addition of chromium substantially in the trivalent state. Glass 47 is a comparative example containing no chromium. Examples 48 to 52 show that with the same fixed level of $TiO_2$ of 2.4 wt.% and a $ZrO_2$ content of about 17 wt.% it is possible to obtain improvements over Glass No. 1 in the comparison test, of the same order as with the rare earth containing glasses, with $Cr_2O_3$ contents varying between 0.15% and 0.60%. Comparison with Glass 47 shows how even a very small quantity (0.15%) of chromium produces a significant improvement. As $Cr_2O_3$ is raised above 0.6 wt.%, in order to achieve a satisfactory value for $T_w - T_l$ it is necessary to reduce the $ZrO_2$ content to below 17%. An acceptable improvement in alkali resistance can be achieved with $ZrO_2$ from 6% to 10% and $TiO_2$ above 1% and $Cr_2O_3$ near the upper end of its range, as in Examples 57 to 59. The upper limit for $ZrO_2$ is 22 wt.% (See Example 60) though the formulation of fiberisable glasses becomes difficult at this level because $T_w$ is as high as 1350° C.

Comparative Example 61 and Examples 62, 63, 51 and 53 to 56 illustrate the effects of increasing amounts of $TiO_2$ up to 10 wt.%. in glasses containing no rare earth oxides Glass 61 contains no $TiO_2$ and shows in comparison with Example 62 how the addition of 0.5% $TiO_2$ results in a fulfilment of the above-mentioned criteria for a worthwhile improvement in resistance. Examples 51, 53 and 63 show the beneficial effect of further increasing $TiO_2$ content while maintaining a constant level of $Cr_2O_3$ and $ZrO_2$. Examples 54, 55 and 56 demonstrate the use of levels of $TiO_2$ at or near the top end of the $TiO_2$ range.

As regards the ranges from which glasses are chosen, the teaching as regards $SiO_2$, $R_2O$ and $R'O$ outlined above in respect of the glasses containing rare earth oxides applies to the glasses in which the rare earth oxides are absent. Examples 64 and 65 illustrate glasses at extreme ends of the $SiO_2$ range, while Examples 65, 66 and 67 show glasses near the ends of the ranges for $R_2O$. Examples 68 and 69 illustrate the upper end of the $R'O$ range. In general, as before, we prefer to operate in a $SiO_2$ range of from 57 wt.% to 69 wt.% and $R_2O$ is preferably from 14 to 17 wt.%.

Examples 84, 70 and 71 illustrate the use of $Al_2O_3$ at and near the upper end of its range. Examples 73 to 83 illustrate the use of various possible $R'O$ components, as well as $V_2O_5$, $Ta_2O_5$, $MoO_3$, $HfO_2$ and $ThO_2$, while Example 85 shows the use of fluorine, added as $CaF_2$.

It has been found that the conditions which are normally employed when producing a chromium-tinted container glass to achieve a particular level of trivalent chromium in the glass can be used in the present invention. In particular, we prefer to favour the formation of $Cr^{3+}$ by melting under gas firing using conditions where a reducing flame is produced. The glass batch should also contain anthracite or other suitable reducing agent. Compounds which under these conditions reduce to a metal, such as tin compounds, should preferably be absent so that when forming continuous filaments in a platinum bushing, contamination and attack on the bushing is avoided. Such procedures were used in all the Examples of the Table and ensure that at least 70% of the chromium is in the $Cr^{3+}$ state.

The formation of continuous filaments by drawing from a platinum bushing is carried out on a commercial scale by feeding a series of bushings arranged along a forehearth with molten glass from a glass melting tank. A typical forehearth, tank and bushing arrangement are shown in K. L. Lowenstein's book "The Manufacturing Technology of Continuous Glass Fibres" published by Elsevier in 1973, at page 40 and at pages 60 to 66. Non-oxidising conditions in such arrangements are ensured by normal atmosphere control methods.

The multiple filaments drawn from each bushing are coated with a size and grouped into strands. Several strands are then loosely grouped together to form a roving, which is chopped to a desired length to form chopped strands.

The chopped strands may be incorporated in cementitious products, e.g. as a replacement for asbestos fibres, by various methods. They may be mixed into an aqueous cement slurry which is subsequently formed into desired shape, de-watered and cured. The production of the cementitious product may be carried out on a machine of the type normally used for making asbestos cement articles, e.g. a machine of the known Magnani or Hatschek type. In this case, it may be advantageous in some circumstances to have used, for at least some of the strands of glass filaments, a size which dissolves in water, so that at least some of the strands disperse into single filaments in the slurry. Alternatively, the glass fibre may be projected direct from a chopping gun into a mould into which a cement/water slurry is simultaneously being projected, the slurry being again de-watered and cured. In another method, the rovings may be used without chopping, e.g. in making a wound reinforcement for cement pipes.

Generally the amount of glass fibre used is from 3% to 6% by weight of the cement.

Figure 1:
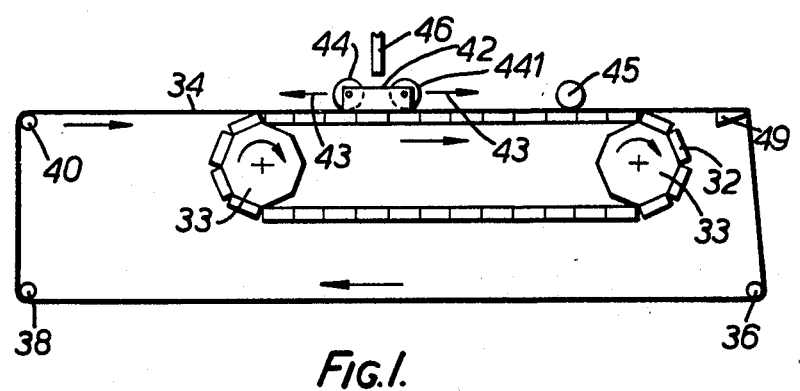
FIG. 1 is a diagrammatic elevational view of a machine of the Magnani type for producing sheets of fibre-reinforced cement material, which can be supplied with a cement/water slurry containing glass fibre.

The Magnani-type machine for manufacturing fibre-reinforced cement sheets illustrated in FIG. 1 has a continuous sectional perforated moving bed 32 passing around two rotatable rollers 33. The moving bed 32 is closed off at its sides and its interior is connected to a suction pump (not shown). A continuous water-permeable cloth belt 34 is guided around a number of rotatably mounted cylindrical rollers, three of which are shown and designated 36, 38 and 40. The cloth belt 34 is supported by the top of the moving bed 32 and passes between the top of the moving bed 32 and a slurry distributor in the form of a carriage 42 spaced above the belt 34. The carriage 42 is mounted for reciprocatory movement between fixed limits above the moving bed as shown by the arrows 43 and carries two rollers 44, 441, which extend transversely across the width of the belt 34.

Above the carriage 42 is a depending slurry delivery pipe 46 mounted for movement with the carriage 42. The slurry pipe 46 is connected to a supply of the glass fibre-containing cement/water slurry. A calendering roller 45 is located transversely across the belt 34 downstream of the carriage 42.

In operation, the moving bed 32 and the cloth belt 34 are traversed around their respective paths slowly in the direction shown and the slurry flows out of the slurry pipe 46 into the slurry distributor carriage 42. The slurry is uniformly distributed on the belt 34 in incremental layers by the reciprocating movement of the carriage 42 so as to build up a sheet on the belt 34. The calendering roller 45 compresses the sheet of slurry to a desired thickness. The sheet of slurry is dewatered as it travels forward by the suction acting through the moving bed 32 and cloth belt 34 until the slurry reaches a sufficiently rigid state to be removed from the belt 34 at 49.

Figure 2:
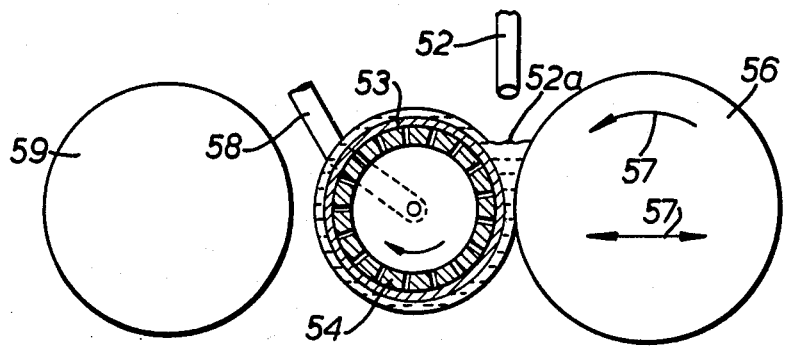
FIG. 2 is a diagrammatic elevational view of a Magnani-type machine for producing pipes of fibre-reinforced cement material, also capable of being supplied with a cement/water slurry containing glass fibre.

FIG. 2 illustrates a Magnani-type machine for manufacturing fibre-reinforced cement pipes. A slurry distributor pipe 52 is located over a nip 52a defined between a steel forming roller 56 and the outer surface of a water-permeable filter cloth 53 wrapped tightly around a perforated hollow metal mandrel 54 which rotates clockwise as seen in FIG. 2. The slurry distributor pipe 52 is reciprocable back and forth along the length of the nip 52a, i.e. perpendicular to the plane of the paper in FIG. 2. The roller 56 is movable in a horizontal plane and is rotatable anticlockwise, as indicated by the arrows 57. Horizontal movement of the roller 56 to the right in FIG. 2 against spring pressure permits the fibre-reinforced cement material to build up on the filter cloth 53 around the mandrel 54 whilst maintaining a compacting pressure against the material. The mandrel 54 has closed ends and has its interior connected by means of a suction pipe 58 to a suction pump (not shown). A further roller 59 is positioned at a fixed distance from the mandrel.

In operation, the glass fibre-containing cement/water slurry is fed through the pipe 52 to the nip between the filter cloth 53 on mandrel 54 and roller 56, so that incremental layers of slurry are built up on the filter cloth 53. The roller 56 smooths the surface and compresses the slurry as it is deposited on the filter cloth whilst the suction applied through the mandrel 54 de-waters the slurry. A tough and dense homogeneous cylinder of the cement composite material is thus built up on the filter cloth 53. When the desired thickness has been obtained, the roller 59 comes into action to complete the smoothing and compression of the cement composite material.

The mandrel 54 with the formed fibre-reinforced cement pipe is removed from the machine and transferred to a second unit where the mandrel 54 is withdrawn and the cement is allowed to cure. Wooden formers can be inserted in the pipe to maintain its true shape until the cement has fully cured.

Figure 3:
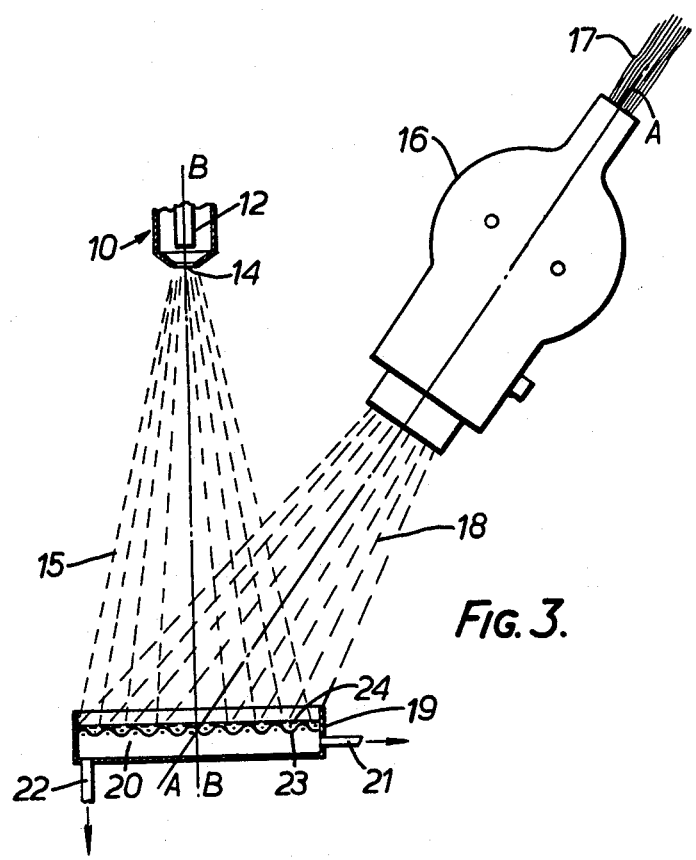
FIG. 3 is a diagrammatic illustration of the production of a glass-fibre reinforced cement board by a "spray-up" method

FIG. 3 illustrates another known type of apparatus for making glass fibre reinforced cement boards by a "spray-up" method. A spraying nozzle 10 fed with a cement/water slurry has a central air pipe 12 connected to a source of high pressure air, say at 5 bars; and projects a conical stream 15 of the slurry from its orifice 14. A chopping gun 16 of known type receives a roving 17 of strands of continuous filament glass fibre and a supply of air at a similar high pressure, chops the glass fibre roving into strands of desired length, say 1 to 5 cm, and expels the chopped strands in an air-borne stream 18 whose axis A—A is at an angle to but intersects the axis B—B of the stream 15 of slurry.

At the intersection of the two streams is disposed a rectangular former 19 whose base 20 forms a vacuum chamber connected at 21 to a source of suction at say 1 bar below atmospheric pressure and to a drain 22. The top of the vacuum chamber is formed by a mesh surface 23 which in turn is covered by a liner 24 of wet-strength paper.

The assembly of spraying nozzle 10 and chopping gun 16 is reciprocated along the length of the former 19, perpendicular to the plane of the paper. The streams of slurry and glass fibre mix together before being deposited in the former 19, where the glass-fibre containing slurry is built up to the desired thickness and is thereafter de-watered by suction through the paper liner 24 and mesh 23.

In the particular boards used for the tests whose results are shown in FIGS. 4 to 7, the boards were built up to a thickness of 7 mm, with a content of approximately 5.5% glass fibre by weight, the fibres being chopped to a strand length of 37 mm. To obtain the required comparisons, one half of each board was sprayed up using a glass fibre in accordance with the present invention while the other half was made up using fibres of Glass No. 1. The glass fibres were in each case drawn at a temperature at which the viscosity was 1000 poises from a platinum bushing having 408 tips. The size used on each type of fibre was the same. The multiple filaments were grouped into strands and the strands were formed into a roving in conventional manner, with a tex (i.e. a weight in grams per kilometer length) of about 2400.

The boards were made from a slurry containing 3 parts cement to 1 part of sand. The water/cement ratio of the slurry was 0.5, and after the application of vacuum, this ratio was about 0.3. The boards were then treated as follows:

| | | |
|---|---|---|
| Boards with Fibre 15 + Comparison Boards with Glass No. 1 fibre | Initial cure | 16 hours simply covered with a plastic sheet. |
| | Further cure | 7 days at 100% Relative Humidity at 20° C. |
| Boards from Fibre 53 + Comparison Boards with Glass No. 1 fibre | Initial cure | 16 hours simply covered with a plastic sheet. |
| | Further cure | 28 days at 100% Relative Humidity at 20° C. |

In order to measure the performance of the glass fibres of the invention and to assess whether the improvement obtained in tests on single strands was still found in full scale trials of the material, coupons were cut from the boards for accelerated testing.

Coupons 160 mm×50 mm were cut along the length of a board, and also at right angles to the length of the board. The coupons were then immersed in water at 50° C.

Enough coupons were cut from each board to provide a series of samples. This meant that the strength of the coupons could be determined on a time basis, by removing a number of the coupons from the water at set intervals, and measuring the same number of coupons from each board after each time interval. In order to provide a more accurate indication of strength, each measurement was taken as an average of measurements on four coupons, two cut along the length of the board and two cut at right angles to the length of the board. One of the two coupons cut from each direction was tested with its lower side up (i.e. the side which was in contact with the mould surface) and the other with its upper side up.

Figure 4:
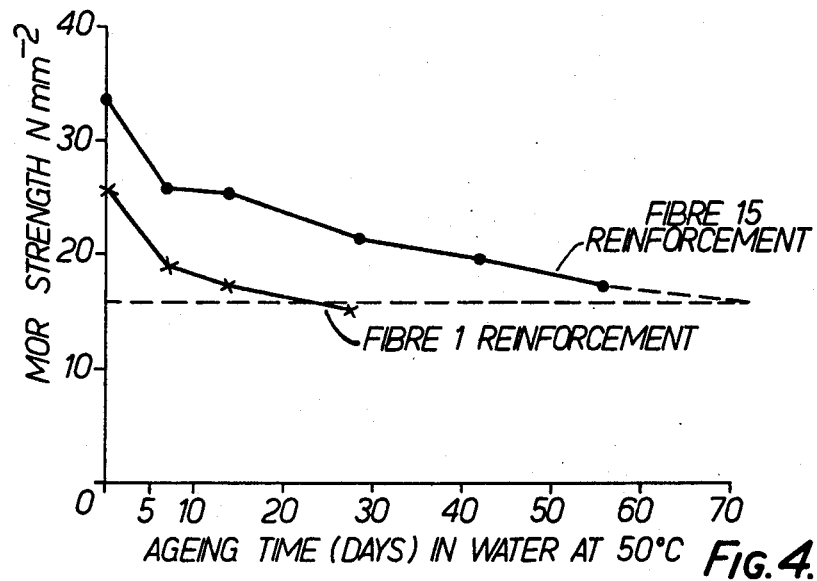
FIG. 4 shows in graphical form the results of measurements of the modulus of rupture (flexural strength) of cement boards produced by the method illustrated in FIG. 3 and made using glass fibres of Example 15 from the Table above, after periods of accelerated ageing, with the results for boards containing fibres of Glass No. 1 for comparison.
Figure 5:
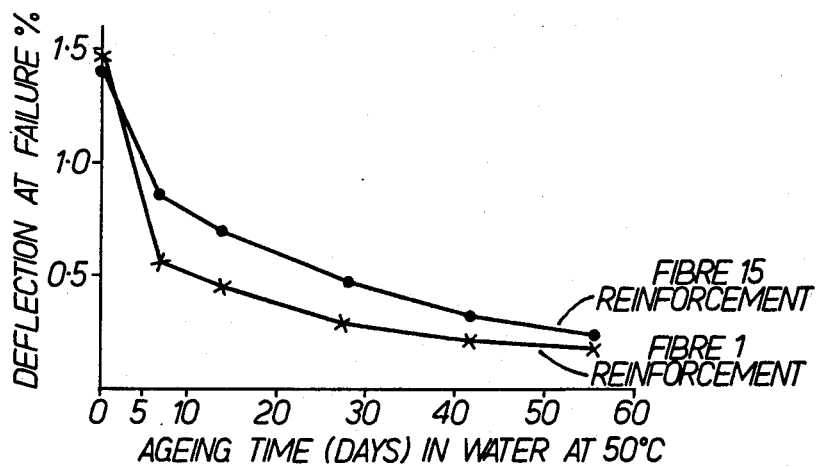
FIG. 5 shows the results of measurements of deflection at failure for the same materials.
Figure 5:
Figure 6:
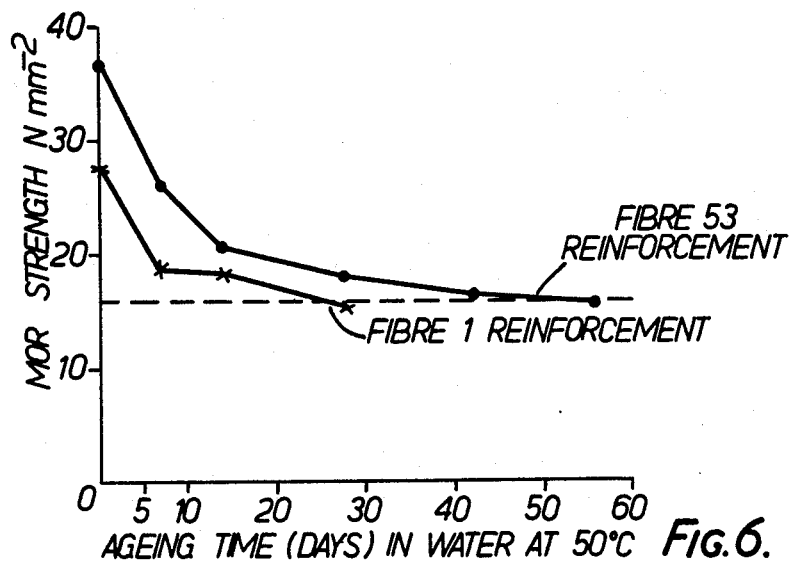
FIG. 6 shows the results of measurements similar to those of FIG. 4 for boards made using glass fibres of Example 53 above, again with the results for boards containing fibres of Glass No. 1 for comparison.
Figure 7:
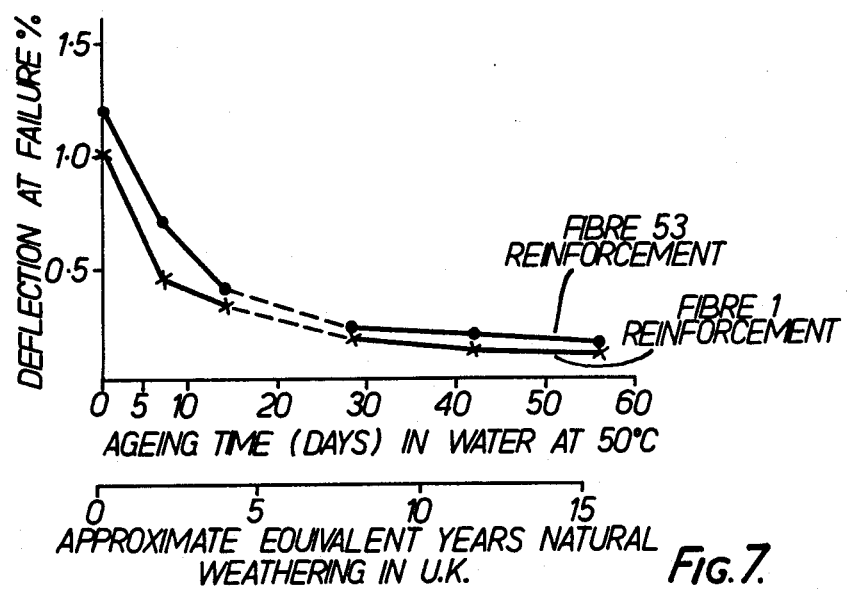
FIG. 7 shows results of measurements of deflection at failure for these materials.

Measurements were made of the modulus of rupture (flexural strength) and strain to maximum stress, i.e. deflection at failure, of the coupons. The results are presented in FIGS. 4 to 7. FIGS. 4 and 5 show the results for the boards made using glass fibres of Example 15, as compared with boards using fibres of Glass No. 1, while FIGS. 6 and 7 show similar results for the boards made with fibres of Example 53 compared with Glass No. 1.

The long term flexural strength (MOR) of sprayed de-watered boards is around 13.5 to 14 $Nmm^{-2}$. From a design point of view, the time taken for the MOR to decay to 16 $Nmm^{-2}$ is significant. The graphs for MOR (FIGS. 4 and 6) therefore indicate the time at which this figure is, or is likely to be, reached. For each pair of FIGS. 4, 5 and 6, 7, an indication has also been given of the approximate equivalent in years of natural weathering in the United Kingdom to the periods of accelerated ageing at 50° C. to which the coupons were subjected.

The results show that boards reinforced with glass fibre of Example 15 had an improved MOR which was not likely to decay to a level of 16 $Nmm^{-2}$ in less than about 70 days at 50° C., equivalent to at least 18 years in natural weathering, compared with 22 days at 50° C., equivalent to about 6 years in natural weathering, for boards reinforced with fibres of Glass No. 1. The glass fibre of Example 53 also had an improved MOR which did not decay to 16 $Nmm^{-2}$ in less than about 50 days at 50° C., equivalent to 14 years natural weathering. The results for deflection at failure show a similar improvement.

Another method by which glass fibres according to the invention may be incorporated in cementitious products is by mixing the chopped strands into a water/cement slurry using a known type of mixing apparatus, and then casting the slurry into a mould or former and de-watering it by suction and/or pressure.

We claim:

1. Alkali-resistant glass fibres for use as reinforcement in cementitious products, formed from a composition comprising, in weight percentages:

| | |
|---|---|
| $SiO_2$ | 55 to 75% |
| $R_2O$ | 11 to 23% |
| $ZrO_2$ | 6 to 22% |
| $Cr_2O_3$ | 0.1 to 1% |
| $Al_2O_3$ | 0.1 to 7% |

-continued

| | |
|---|---|
| Rare earth oxides + TiO$_2$ | 0.5 to 16% | where R$_2$O is any one or more of Na$_2$O, K$_2$O or Li$_2$O, the content of TiO$_2$ does not exceed 10%, and the total of the components recited above amounts to at least 88% by weight of the glass, the glass having been melted under non-oxidising conditions such that all or a substantial proportion of the chromium in the glass is in the trivalent state.

2. Glass fibres according to claim 1 wherein the composition further comprises
   R'O up to 9% by weight,
where R'O is any one or more of MgO, CaO, SrO, BaO, ZnO, FeO, MnO, CoO, NiO and CuO.

3. Glass fibres according to claim 1 wherein the content of Al$_2$O$_3$ does not exceed 5% when ZrO$_2$ exceeds 13%.

4. Glass fibres according to claim 1 wherein the composition further comprises
   B$_2$O$_3$ up to 5% by weight.

5. Glass fibres according to claim 1 wherein the composition further comprises
   PbO up to 2% by weight
the glass having been melted under conditions which avoid formation of lead metal in the glass.

6. Glass fibres according to claim 1 wherein the composition further comprises
   ThO$_2$ up to 4% by weight.

7. Glass fibres according to claim 1 wherein the composition further comprises
   F up to 1% by weight.

8. Glass fibres according to claim 1 wherein the composition further comprises any one of V$_2$O$_5$, Ta$_2$O$_5$, MoO$_3$ or HfO$_2$ in an amount of up to 2% by weight.

9. Glass fibres according to claim 1 wherein the content of rare earth oxides does not exceed 10%.

10. Glass fibres according to claim 1 wherein the content of rare earth oxides exceeds 2.8% and the content of TiO$_2$ does not exceed 5%.

11. Glass fibres according to claim 1 wherein the amounts of the individual R$_2$O components are within the ranges:

| | |
|---|---|
| Na$_2$O | 6 to 20% |
| K$_2$O | 0 to 10% |
| Li$_2$O | 0 to 3% |

12. Glass fibres according to claim 1 wherein the total content of R$_2$O is from 14 to 17%.

13. Glass fibres according to claim 1 wherein the content of SiO$_2$ is from 57 to 69%.

14. Cementitious products reinforced with glass fibres according to claim 1.

15. Cementitious products according to claim 14, comprising from 3 to 6 weight % of the glass fibres in a cementitious matrix.

* * * * *